(12) United States Patent
Hood et al.

(10) Patent No.: US 7,981,229 B2
(45) Date of Patent: *Jul. 19, 2011

(54) METHOD OF MAKING AND USING SHAPE MEMORY POLYMER PATCHES

(75) Inventors: Patrick J. Hood, Bellbrook, OH (US); Sean Garrigan, Beavercreek, OH (US); Frank Auffinger, Hamilton, OH (US)

(73) Assignee: Cornerstone Research Group, Inc, Dayton, OH (US)

( * ) Notice: Subject to any disclaimer, the term of this patent is extended or adjusted under 35 U.S.C. 154(b) by 1224 days.

This patent is subject to a terminal disclaimer.

(21) Appl. No.: 11/611,184

(22) Filed: Dec. 15, 2006

(65) Prior Publication Data

US 2007/0264456 A1  Nov. 15, 2007

Related U.S. Application Data

(63) Continuation of application No. 11/569,902, filed on Sep. 8, 2008, now Pat. No. 7,938,923, and a continuation of application No. PCT/US2005/019842, filed on Jun. 6, 2005.

(60) Provisional application No. 60/577,003, filed on Jun. 4, 2004.

(51) Int. Cl.
*B29C 65/00* (2006.01)
*B29C 73/00* (2006.01)

(52) U.S. Cl. ...... 156/94; 156/95; 156/304.1; 156/304.2; 156/304.3; 138/97; 138/98; 138/99

(58) Field of Classification Search .................. 156/94, 156/95, 304.1, 304.2, 304.3, 102, 106; 138/97, 138/98, 99
See application file for complete search history.

(56) References Cited

U.S. PATENT DOCUMENTS

| 4,675,061 A | 6/1987 | Mead |
| 4,950,258 A | 8/1990 | Kawai et al. |
| 5,139,832 A * | 8/1992 | Hayashi et al. ............... 428/35.5 |
| 5,388,617 A | 2/1995 | Sasaki et al. |
| 5,442,037 A * | 8/1995 | Lee et al. ....................... 528/301 |
| 5,804,276 A | 9/1998 | Jacobs et al. |
| 6,083,442 A | 7/2000 | Gabilly |
| 6,388,043 B1 | 5/2002 | Langer et al. |
| 6,759,481 B2 | 7/2004 | Tong |
| 6,986,855 B1 | 1/2006 | Hood et al. |
| 2002/0137864 A1 | 9/2002 | Tong |

FOREIGN PATENT DOCUMENTS

| DE | 19649086 | * | 8/1998 |
| DE | 29920347 | * | 2/2000 |
| EP | 0498602 A | | 8/1992 |
| JP | 2-220843 | * | 9/1990 |
| JP | 02-289344 A | | 11/1990 |
| JP | 03-033595 A | | 2/1991 |
| WO | WO 96/12588 | | 5/1996 |
| WO | WO 01 64387 | | 7/2001 |

* cited by examiner

*Primary Examiner* — Justin Fischer

(57) ABSTRACT

Patches consisting of transparent or translucent shape memory material can be manufactured so as to affect repair of transparent or translucent parts that have been damaged. These patches can be used to cover cracks and holes or provide additional structural support for the damaged parts. The patches can vary greatly in size and properties depending on the desired application.

39 Claims, 9 Drawing Sheets

METHOD OF MAKING AND USING SHAPE MEMORY POLYMER PATCHES

CROSS-REFERENCE TO RELATED APPLICATIONS

This application is a continuation of U.S. Utility application Ser. No. 11/569,902 filed Sep. 8, 2008, now U.S. Pat. No. 7,938,923, and PCT application PCT/US2005/019842 filed Jun. 6, 2005, which both claim priority to U.S. Provisional Patent Application Ser. No. 60/577,003 filed Jun. 4, 2004.

STATEMENT REGARDING FEDERALLY SPONSORED RESEARCH

This invention was made with Government support under contract NNK05OA29C awarded by the National Aeronautics and Space Administration. The Government has certain rights in the invention.

BACKGROUND OF THE INVENTION

1. Field of the Invention

The present invention generally relates to the temporary and permanent repair of components made from material such as plastics, glass, and other translucent or transparent materials. It is to be appreciated that the present invention has general and specific industrial application in the repair of various materials with preference to transparent and translucent materials.

Generally, polymers have the advantages of weight saving, high specific mechanical properties, and good corrosion resistance, which make them indispensable materials in all areas of manufacturing. Nevertheless, manufacturing costs are sometimes detrimental, since they can represent a considerable part of the total costs and are made even more costly by the inability to quickly and easily repair these materials without a complete, and expensive, total replacement. Furthermore, the production of complex shaped parts is still a challenge for the industry. The limited potential for complex shape forming offered by advanced materials leaves little scope for design freedom in order to improve mechanical performance and/or integrate supplementary functions. This has been one of the primary limitations for a wider use of advanced polymers and materials in cost-sensitive large volume applications. Additionally, the nature of these materials does not lend itself to easy repair, especially on cheap, mass-produced items and repair kits for more expensive, specialty items (such as in the aeronautical industry) which are bulky, expensive, and require a long time to complete the repair.

2. Description of Related Art

Shape memory polymers (SMP) and shape memory alloys (SMA) were first developed about 20 years ago and have been the subject of commercial development in the last 10 years. SMPs are polymers that derive their name from their inherent ability to return to their original "memorized" shape after undergoing a shape deformation. SMPs that have been preformed can be deformed to any desired shape below or above their glass transition temperature ($T_g$). If the SMP is below the $T_g$, this process is called cold deformation. When deformation of the SMP occurs above its $T_g$, the process is denoted as warm deformation. In either case the SMP must remain below, or be quenched to below, the $T_g$ while maintained in the desired deformed shape to "lock" in the deformation. Once the deformation is locked in, the polymer network cannot return to a relaxed state due to thermal barriers. The SMP will hold its deformed shape indefinitely until it is heated above its $T_g$, whereat the SMP stored mechanical strain is released and the SMP returns to its preformed state.

SMPs are not simply elastomers, nor simply plastics. They exhibit characteristics of both materials, depending on their temperature. While rigid, an SMP demonstrates the strength-to-weight ratio of a rigid polymer; however, normal rigid polymers under thermal stimulus simply flow or melt into a random new shape, and they have no "memorized" shape to which they can return. While heated and pliable, an SMP has the flexibility of a high-quality, dynamic elastomer, tolerating up to 400% elongation or more; however, unlike normal elastomers, an SMP can be reshaped or returned quickly to its memorized shape and subsequently cooled into a rigid plastic. Most SMP can repeat this process at least several thousand times before losing its "shape memory effect."

Several known polymer types exhibit shape memory properties. Probably the best known and best researched polymer types exhibiting shape memory polymer properties are polyurethane polymers. Gordon, *Proc of First Intl. Conf. Shape Memory and Superelastic Tech.*, 115-120 (1994) and Tobushi et al., *Proc of First Intl. Conf. Shape Memory and Superelastic Tech.*, 109-114 (1994) exemplify studies directed to properties and application of shape memory polyurethanes. Another known polymeric system, disclosed by Kagami et al., *Macromol. Rapid Communication*, 17, 539-543 (1996), is the class of copolymers of stearyl acrylate and acrylic acid or methyl acrylate. Other SMP polymers known in the art include articles formed of norbornene or dimethaneoctahydronapthalene homopolymers or copolymers, set forth in U.S. Pat. No. 4,831,094. Styrene copolymer-based SMPs are disclosed in U.S. Pat. No. 6,759,481 which is incorporated herein by reference. Additionally cyanate ester-based SMPs are disclosed in PCT Application PCT/US2005/015685 which is incorporated herein by reference.

Glass and plastics are used everywhere. When damage occurs to such materials, the normal repair method is a total replacement of the part. For example, parts which have suffered impact damage from a flying stone or other debris or from a dropped tool, a damage crater, crack, or hole often require total replacement as there are no current methods which provide adequate means of short or long-term repair and still provide a means for light to pass through the damaged part.

There are times when completely replacing a part is not satisfactory. This is due to the cost of replacement and the likelihood the replacement becoming damaged as well very soon after the repair. Additionally, depending on the part being repaired, it normally takes a long amount of time to remove, replace, and test the component, especially if the part is on an aircraft, automobile, or building.

Means of using resins and resin composites to repair parts are known in the art and these repair patches have been used both for repairing holes in drywall material as well as repairing holes in automobile bodies. U.S. Pat. No. 5,075,149 issued to Owens et al. ("Owens"), U.S. Pat. No. 4,707,391 issued to Hoffmann ("Hoffmann '391") and U.S. Pat. No. 4,135,017 issued to Hoffmann ("Hoffmann '017") are all directed to multi-layer repair patches.

Owens discloses a three-layered patch with a metal plate disclosed between two polyester sheets. The metal plate is held in place between the two polyester sheets with a semi-solid adhesive such as urethane. The semi-solid adhesive fixedly attaches the two polyester sheets together as well as fixedly attaching the reinforcing metal plate between the two sheets. Owens is not useful for repairs which require the application of bonding material or plaster to the repair patch because the bonding material or plaster cannot readily pass through the mesh due to the presence of the urethane adhesive. Additionally the patch cannot be molded quickly, on-site, without additional time and equipment. Finally, the patch described in Owens does not allow for the repair of a transparent or translucent part while simultaneously allowing light to pass through the repair.

Hoffmann '391 discloses a two-layer patch including a perforated metal plate with an outer fiberglass mesh attached to one side of the plate. A glue or adhesive coating is applied to the surface of the plate that is attached to the surface to be repaired and an additional adhesive coating is applied to the inward-facing surface of the fiberglass mesh to attach the mesh to the metal plate as well as to attach the mesh to the surface under repair.

Hoffmann '017 also discloses a two-layer patch. An inner metal plate is covered with adhesive that secures one surface of the plate to the surface under repair. An outer plate cover is laminated onto the exterior side of the metal plate by means of a layer of adhesive applied to the inward-facing side of the plate cover.

Both of these methods employ metal plates in the final patch with limits the ability of these patches to be easily and quickly molded to the damaged part on-site. Additionally, the use of metal eliminates some of the weight saving advantages of a pure composite repair patch. Finally, the patches described in Hoffmann '391 and '017 do not allow for the repair of a transparent or translucent part while simultaneously allowing light to pass through the repair.

Additionally, the repairs alone in these methods can take anywhere from 15-20 minutes to several hours depending on the part or parts to be replaced and the location and size of the part to be replaced. Additionally, the added expense for replacing the part immediately can make the replacement cost significantly more than what was originally planned.

Additionally, if mass-produced items, such as car lights, windshields, windows and other similar manufactured parts are damaged, it is oftentimes less expensive to replace the entire part than to repair it, although such parts are often expensive themselves. Thus, there is a need for a cheap, quick, and effective method of repairing such mass-produced parts and for quickly and reliably repairing other high-end parts.

It is the object of the present invention to provide a preformed and cured patch and a method to quickly and cheaply permanently repair any number of items with a transparent or translucent material which retains similar or greater mechanical properties of the parts repaired. This and other objects of the present invention wilt become apparent from the following specification.

SUMMARY OF THE INVENTION

According to a first aspect of the invention there is provided a patch of shape memory polymer for attachment to a surface of a damaged piece of glass, plastic, or other transparent or translucent material or structure over an area of damage to the structure, the patch defining an outer surface, a bonding surface opposed thereto and a peripheral edge, the patch including shape memory polymer resin with said shape memory polymer resin being in a substantially final state of hardness. The patch may conveniently include a final protective coating applied to the outer surface thereof to prevent or minimize damage to the patch from scratches or other means. The process according to the first aspect is primarily to be used for temporary or cosmetic repair of glass, windows, and plastic manufactured parts.

This patch and process reduces the time to repair glass, plastic, and similar manufacture parts and other material and eliminates the creation of volatile components that must not be released into the environment as per EPA requirements during the repair process. The combination of both of these factors makes this process highly transferable into mass production of patches for low-end and high-performance parts at an affordable price. Additionally the patch can be molded on-site by hand, without the use of significant amounts of equipment or special orders to pre-mold the patch to match the specific damaged area. Another benefit is that by using shape memory polymer as the resin, the damaged part does not need to be removed from the larger component, for example, removing the entire window from the house in order to repair the damage to a single pane in the window.

The patch, according to the first aspect of the invention, will typically be in some predetermined memorized geometric shape, typically a flat square or rectangle, but can be in any desired preformed shape including spherical, cubical, any other flat or three-dimensional geometric shape or cut to match the desired shape. In order to mold the patch to the desired shape of the damaged part, the shape memory polymer resin is activated, typically using heat to raise the temperature of the shape memory polymer resin above its activation temperature or light to activate the shape memory polymer, at which point the shape memory polymer resin become soft and can be mechanically deformed, typically by hand, to the desired shape. Once the shape memory polymer patch has cooled below the activation temperature of the shape memory polymer or has been deactivated by light, the composite part will retain the new, deformed shape, and can be bonded to the damaged part with adhesives.

Bonding the patch to the damaged part is typically accomplished with some form of adhesive. While some adhesives may require heat curing, choosing the correct shape memory polymer to use as the resin matrix will prevent this curing from causing the patch to become soft again, and lose its molded shape, especially if using a light-activated shape memory polymer resin. This presents little difficulty as curing the adhesive may include raising the temperature thereof to a temperature less than substantially 100° C. where there is a large availability of shape memory polymers whose activation temperatures are above 100° C. It wilt be appreciated that adhesive cure temperatures could be as high as 180° C., but repairs in the field are likely to be better if a lower curing temperature resin is used to avoid the possibility damage to the patch or further damage to the part being repaired. Additionally, certain formulations and types of shape memory polymer can be made with a transition temperature well in excess of 180° C. such that high-cure temperatures for most adhesives are of little concern. Where the adhesive is a curable resin the method may include the step of curing the adhesive for a period less than substantially one hour. Such a short curing time can dramatically shorten the overall repair time according to the method of the invention, especially when only the adhesive and not the resin in the patch require curing. Furthermore, some adhesives, such as pressure sensitive adhesives, require no curing, thus eliminating this concern.

Manufacture of the patch according to the invention includes creating a cured shape memory polymer patch. The patch is preformed to a predetermined, memorized shape. The patch may be of any required thickness in order to give the required structural strength in particular circumstances.

It will be appreciated that when carrying out the repair method of the invention all the normal preparatory work may be done to the damaged area in the usual way, for example thorough drying thereof, abrasion and cleaning of the surface to be repaired and debris and sharp edge removal. Best results for the repair are likely to be obtained when the liquid adhesive is painted onto all contact areas with a brush or the like to ensure good adhesion.

The presented aspect of the invention allows for the quick and easy permanent repair of glass, plastic, or other similar transparent or translucent parts or other material. According to the second aspect a part has been damaged and requires permanent repair. Typically the damaged section will have damage to the patch. It is to be appreciated that the initial steps of creating a seamless transition phase between the damaged and undamaged sections of the part can be accomplished by normal means. Additionally, repair to the underlying filler, foam, or other material can be accomplished in a normal means.

Once the damaged area has been removed and a transition area has been created, smoothed, machined, cleaned, and otherwise prepared for repair, a preformed shape memory patch can be used. After activating the shape memory polymer with either heat or light (or other electromagnetic radiation), the patch is then formed and molded into the damaged area either manually or with other means of assistance. Once the patch has been molded to the damaged area, the SMP is deactivated by letting it cool below its transition temperature or exposing it to light or other electromagnetic radiation. When the patch is hard, simply bond the patch's material to the damaged part, clean, and machine the patch to remove any excess patch material to ensure it is flush and level with the damaged part, and sand, finish, and coat if necessary with standard methods.

This patch and process reduces the time necessary for the repair these materials. The combination of both of these factors makes this process highly transferable into mass production of high-performance parts at an affordable price. Additionally, it is to be appreciated that this method of repair requires no curing time for the patch and eliminates the need to wait for any layer to cure before proceeding with the repair, thus significantly reducing the time to permanently repair a damaged part.

Additional embodiments of the present invention include the use of other means of molding the patch and bonding said patch to the damaged part.

Other objects, features, and advantages of the invention wilt be apparent from the following detailed description taken in connection with the examples and accompanying drawings and are within the scope of the present invention.

DETAILED DESCRIPTION OF THE INVENTION

Figure 1:
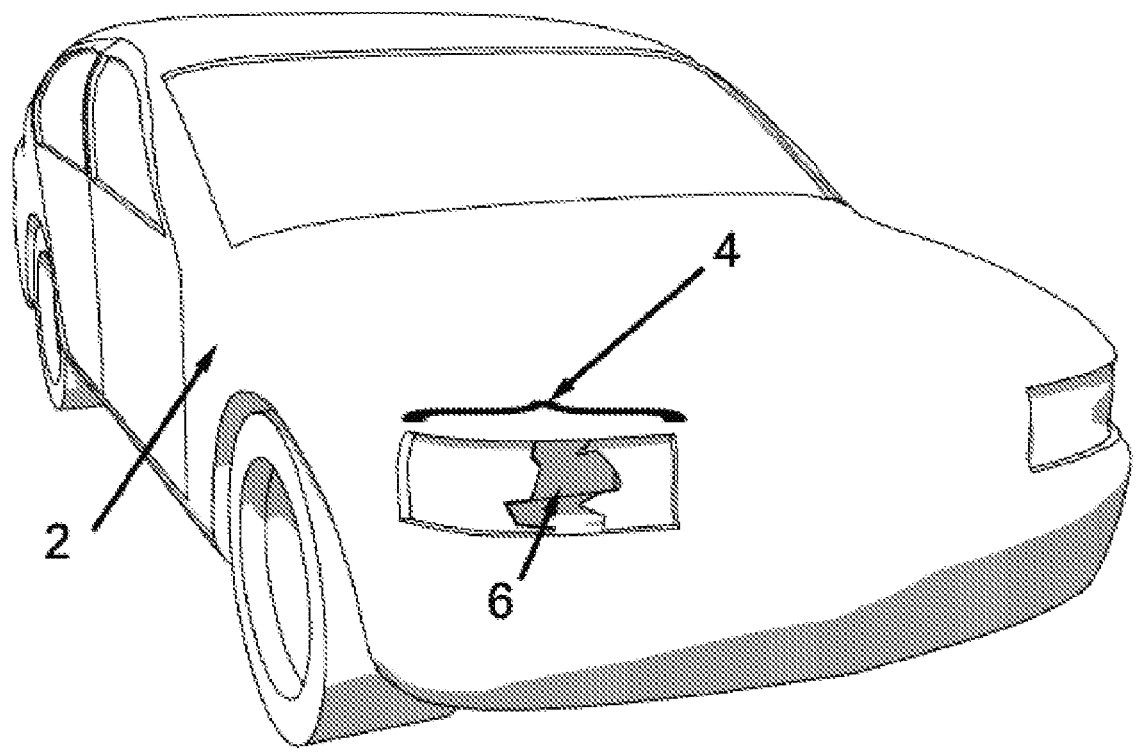
FIG. 1 is a picture of a car with a damaged headlight.

Referring to the drawings in greater detail, the method of the invention herein is directed to fabricating and using a patch of shape memory polymer (SMP) resin or other shape memory material in the manufacture of formable patch.

Examples 1 and 2 below describe the exemplary methods of creating pre-form shape memory polymer (SMP) patches. In general, the preferred SMP is a styrene copolymer-based SMP as disclosed in U.S. Pat. No. 6,759,481; however, other types of SMPs such as cyanate ester, polyurethane, polyethylene homopolymer, styrene-butadiene, polyisoprene, copolymers of stearyl acrylate and acrylic acid or methyl acrylate, norbornene or dimethaneoctahydronapthalene homopolymers or copolymers, malemide and other materials are within the scope of the present invention. Additionally, those of skill in the art will note that most, if not all shape memory polymers can be formulated so that they are transparent or translucent.

EXAMPLE 1

A polymeric reaction mixture was formulated by mixing vinyl neodecanoate (10%), divinyl benzene (0.8%), and styrene (85.2%) in random order to yield a clear solution. Benzoyl peroxide paste (4%) which is 50% benzoyl peroxide, was then added to the resulting solution (all composition % are by weight). The resulting solution was kept cold in a refrigerator before use. To create sheets of the polymeric material useful for patches some of the polymeric reaction mixture is poured between two glass sheets separated by a Viton® spacer. Thoroughly remove air bubbles before curing. Cure the polymer with the following cycle: 1) A one-hour linear ramp to 75° C. in an oven, autoclave, or other form of controlled heating device; 2) A three-hour hold at 75° C.; 3) A three-hour linear ramp to 90° C.; 4) A two-hour linear ramp to 100° C.; 5) A one-hour linear ramp to 20° C. After curing, remove from oven and allow to cool. Remove vacuum bag and glass plates from the cured SMP.

EXAMPLE 2

A polymeric reaction mixture was formulated by mixing vinyl neodecanoate (10%), divinyl benzene (0.8%), and styrene (55.2%) in random order to form a colorless solution. Polystyrene granules (30%) were then added to the resulting solution. The resulting mixture was then allowed to sit at room temperature with occasional stirring until all the polystyrene granules were dissolved to give a clear, viscous solution. Benzoyl peroxide (4%) which is 50% benzoyl peroxide was then added to the resulting solution (all composition % are by weight). The resulting polymeric reaction mixture is continually stirred at or near 25° C., not to exceed 30° C. until a clear solution is achieved which can take 2 hours or more. It is essential that while mixing after the addition of benzyl peroxide that the temperature of the resin be maintained below 30° C. as the mixture may become hot and explosive. Mixing in a cold water or ice bath ensures the temperature will not exceed 30° C. It can take two hours or more to fully mix. The resulting solution is kept cold in a refrigerator before use. To create sheets of the polymeric material useful for patches some of the polymeric reaction mixture is poured between two glass sheets separated by a Viton® spacer. Thoroughly remove air bubbles before curing. Cure the composite part with the following cycle: 1) A one-hour linear ramp to 75° C. in an oven, autoclave, or other form of controlled heating device; 2) A three-hour hold at 75° C.; 3) A three-hour linear ramp to 90° C.; 4) A two-hour linear ramp to 110° C.; 5) A one hour linear ramp to 20° C. After curing, remove from oven and allow to cool. Remove vacuum bag and glass plates from the cured SMP.

Additionally, once cured, the shape memory polymer can be deformed for easy storage, shipping, or immediate use. If deformed for storage or shipping, simply activating the shape memory polymer will restore the part to its original, memorized shape.

The method of repairing all types of components and parts all utilize the same common features. The following description therefore relates to all of these features.

Figure 2:
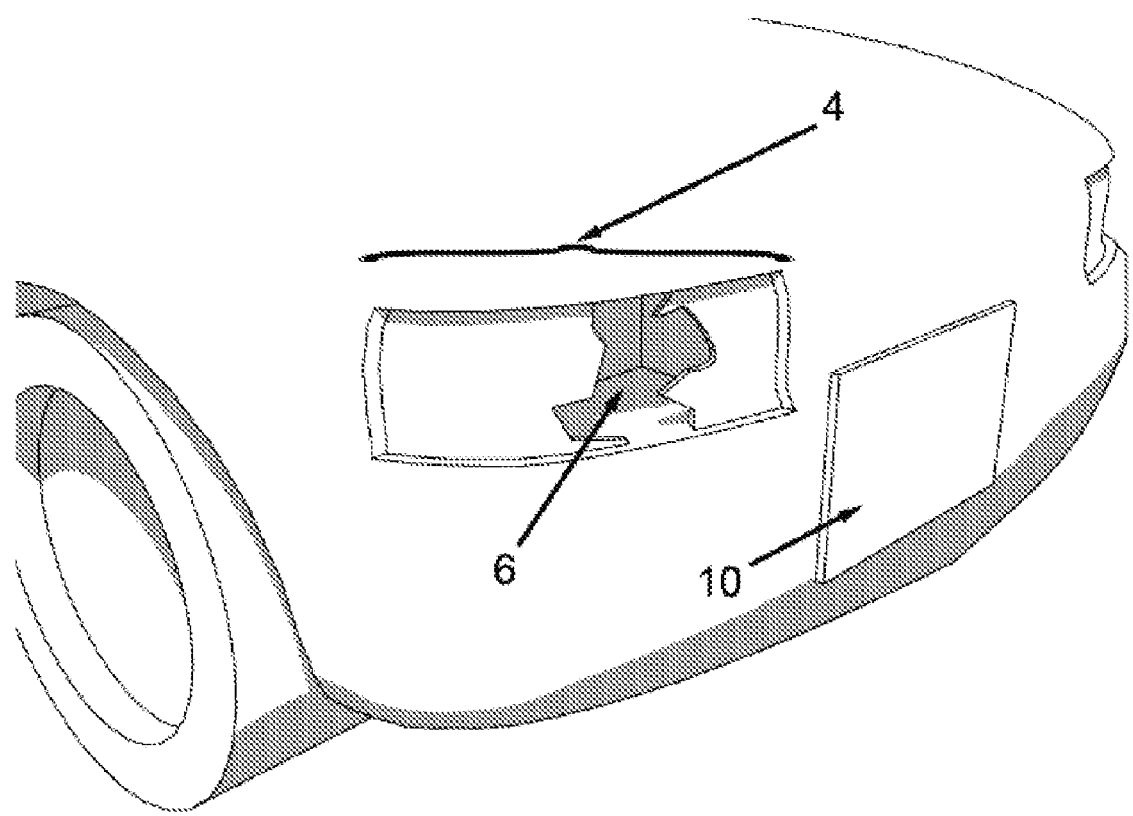
FIG. 2 is a close-up of the damaged headlight and the repair patch that will be used to repair it.
Figure 3:
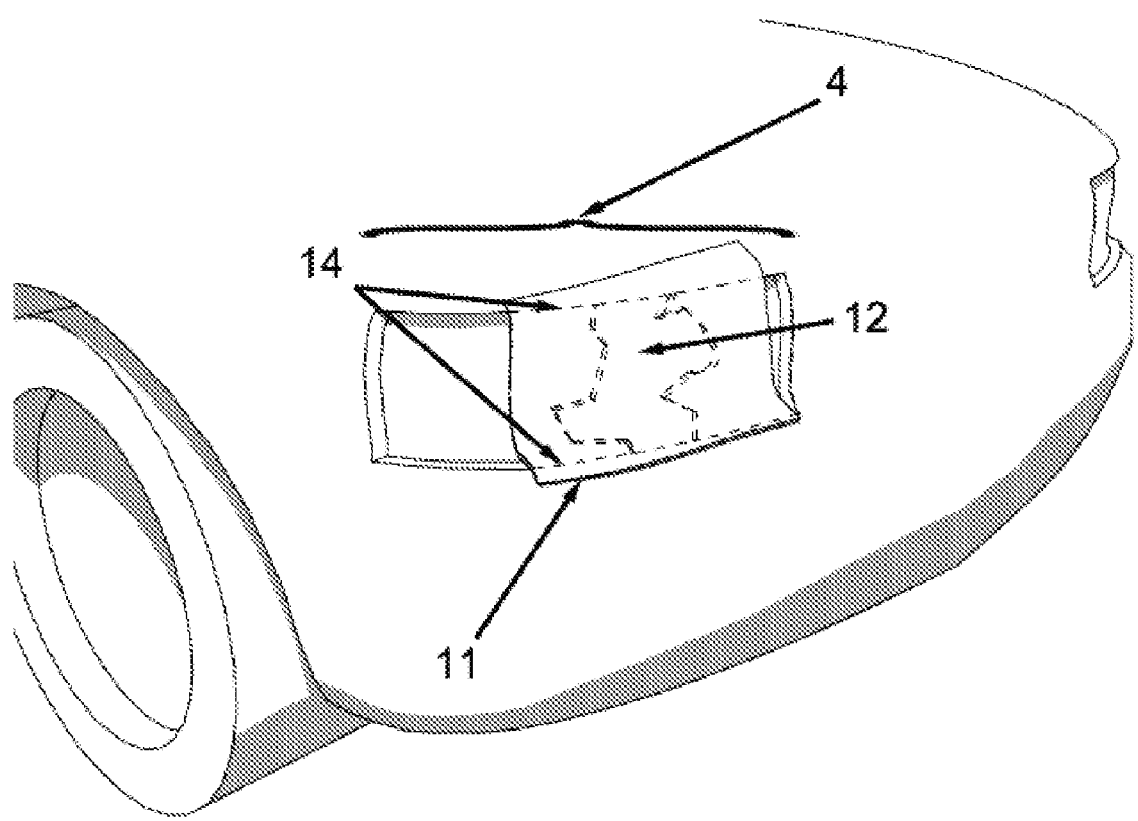
FIG. 3 is a close-up of the repaired headlight showing the transparent nature of the repair.

FIG. 1 shows a typical car, 2, with a damaged headlight, 4, with a damaged area, 6. FIG. 2 shows a close-up view of the damaged headlight, 4, with a clear, flat SMP patch, 10, which after heating can be easily deformed to repair the damaged area, 6. After activation, by either heat, light, or other means, the shape memory polymer resin in the patch, 10, will become soft and can be easily molded to a variety of shapes. In the present example, a driver, wearing gloves, can easily mechanically deform the patch, 10, to cover the damaged area, 6, and follow the curvature of the headlight, 4, as seen in FIG. 3 where the deformed patch, 11, covers the damaged area of the headlight, 12, and essentially replicates the shape of the headlight, 14. After bonding the patch to the pipe with an adhesive the headlight is repaired and the driver can continue with normal operations without fear of violating the law. Additionally, the transparent or translucent nature of the shape memory polymer allows light from the headlight bulb to pass through it in a identical or similar manner as the original, undamaged covering.

Figure 4:
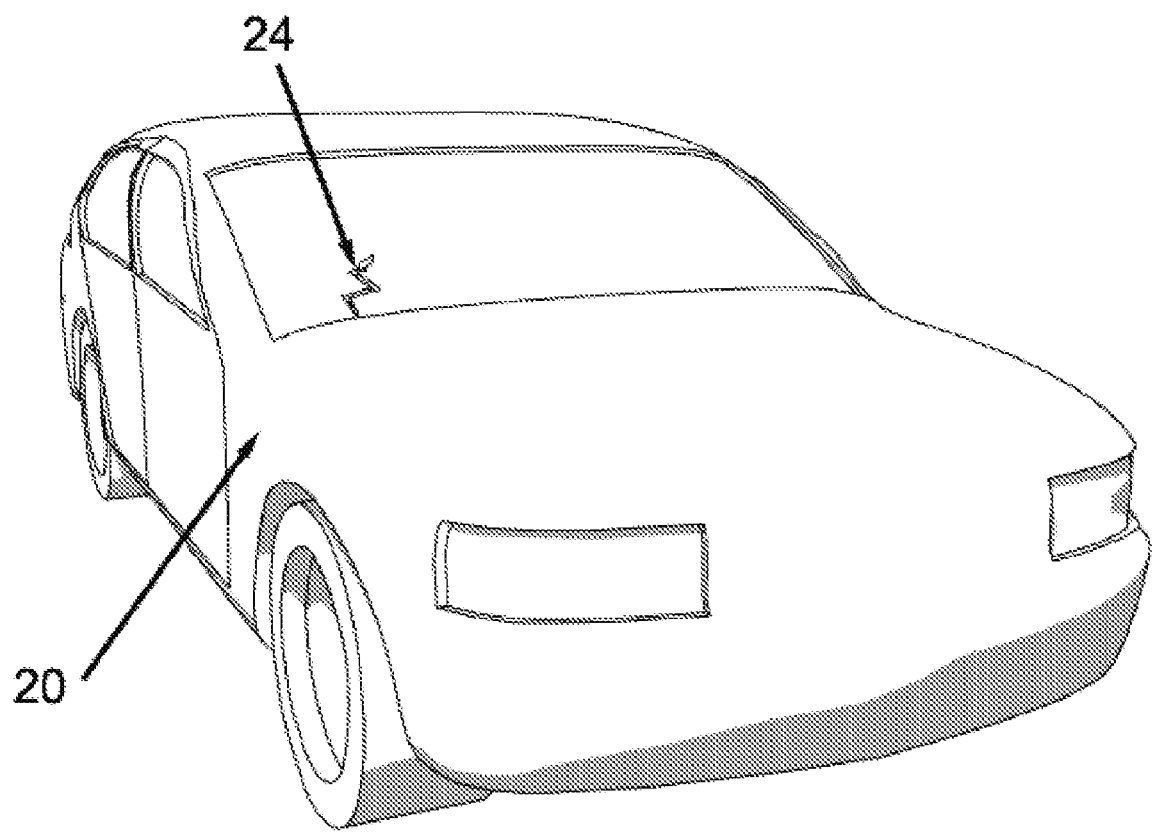
FIG. 4 is a picture of a car with a cracked windshield.
Figure 5:
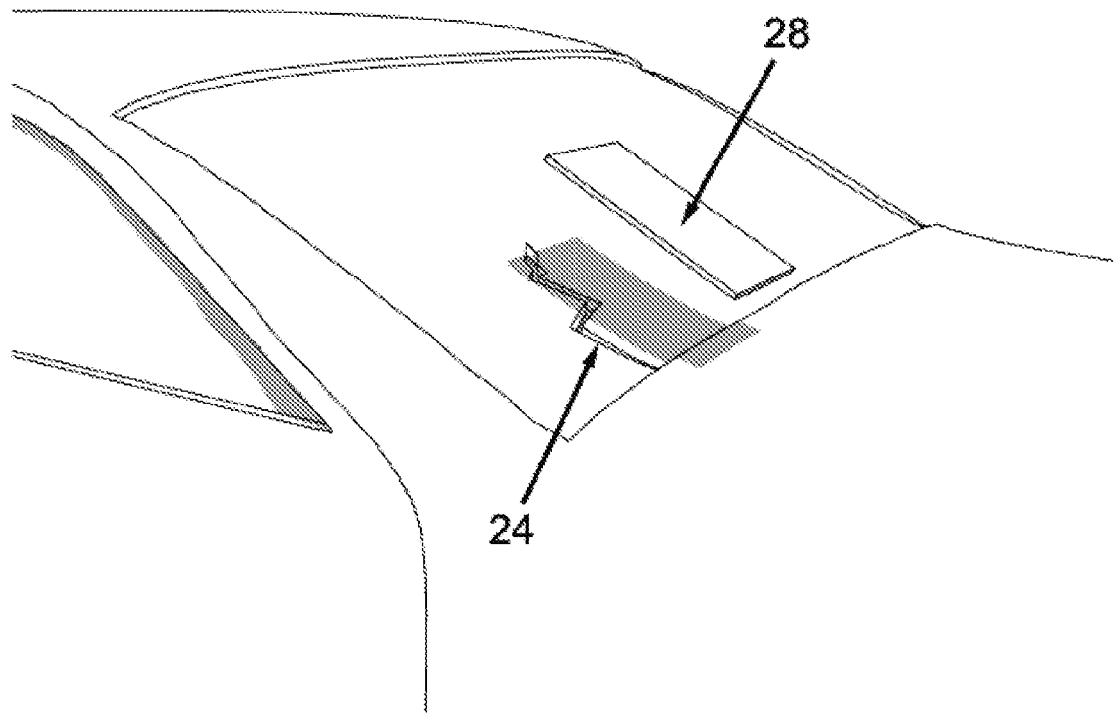
FIG. 5 is a close-up of the damaged windshield and the patch that will be used to repair it.
Figure 6:
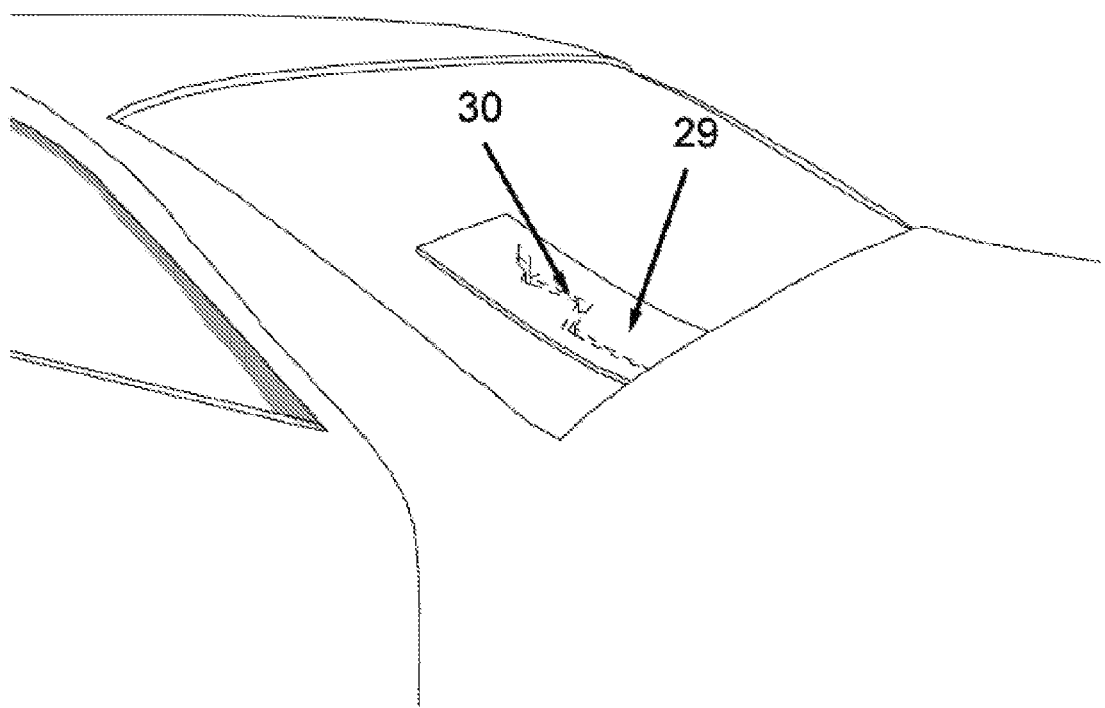
FIG. 6 is a close-up of the repaired windshield showing the transparent nature of the repair.

A second example of how the system can be used to repair common damage to car windshields is shown in FIGS. 4-6. FIG. 4 shows a larger crack, 24, which was likely caused by the impact of a piece of rock or other debris against the windshield of the car, 20, while driving. FIG. 5 shows an SMP patch, 28, which after activation will cause the shape memory polymer resin to become soft and can be easily molded to cover the crack, 24. As before, the driver, wearing gloves, can easily mechanically deform the patch, 28, to cover the crack., 24, as seen in FIG. 6 where the deformed patch, 29, covers not only the crack, 30, in the windshield, but also ensures a good seal between the patch, 29, and the windshield preventing air from flowing into the interior of the automobile. Once the patch is in place and sealed the driver can proceed with normal operations. A seeping adhesive may be used to help fill-in the crack.

Additionally, these repairs can be conducted not only by pure shape memory polymer resins but also by composite material with a shape memory polymer resin matrix which undergo the same activation, deformation, and bonding as seen in the above description.

Another exemplary embodiment provides a means of temporary or permanent repair of windows damaged by flying debris caused by weather events such as tornadoes and hurricanes. Because of the delay in acquiring panes of glass and manufactured windows in hard hit areas, some windows may not be replaced for up to a year and longer. This system can be used to repair or replace glass panes in windows until such time as a replacement is commercially available with the principal advantage of the present system being the transparent or translucent nature of the material can mimic the similar properties of glass while providing similar or improved mechanical properties to glass.

Figure 7:
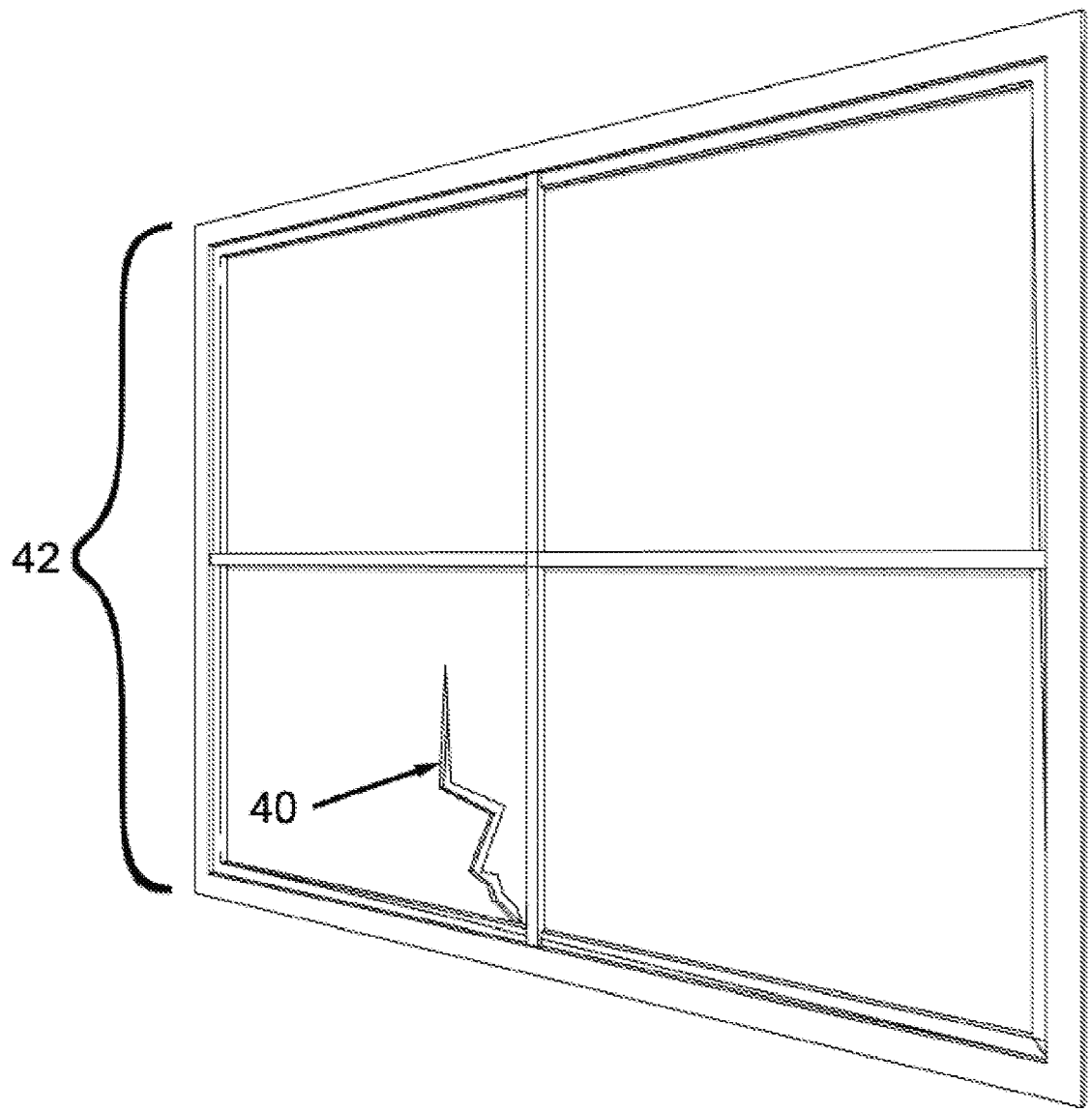
FIG. 7 is a picture of a window with a damaged pane.
Figure 8:
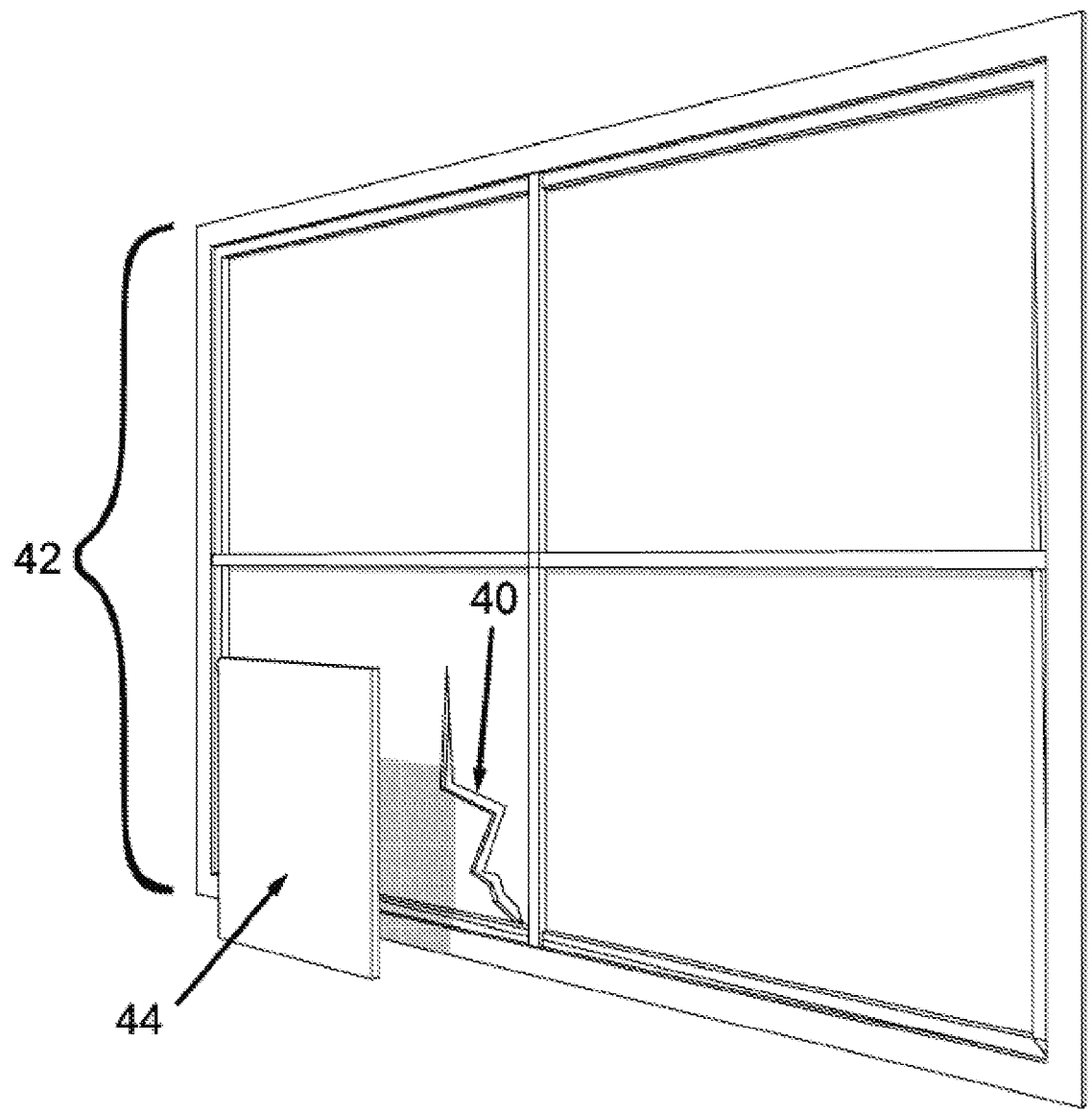
FIG. 8 is a shows the damaged pane and the patch that will be used to repair it.
Figure 9:
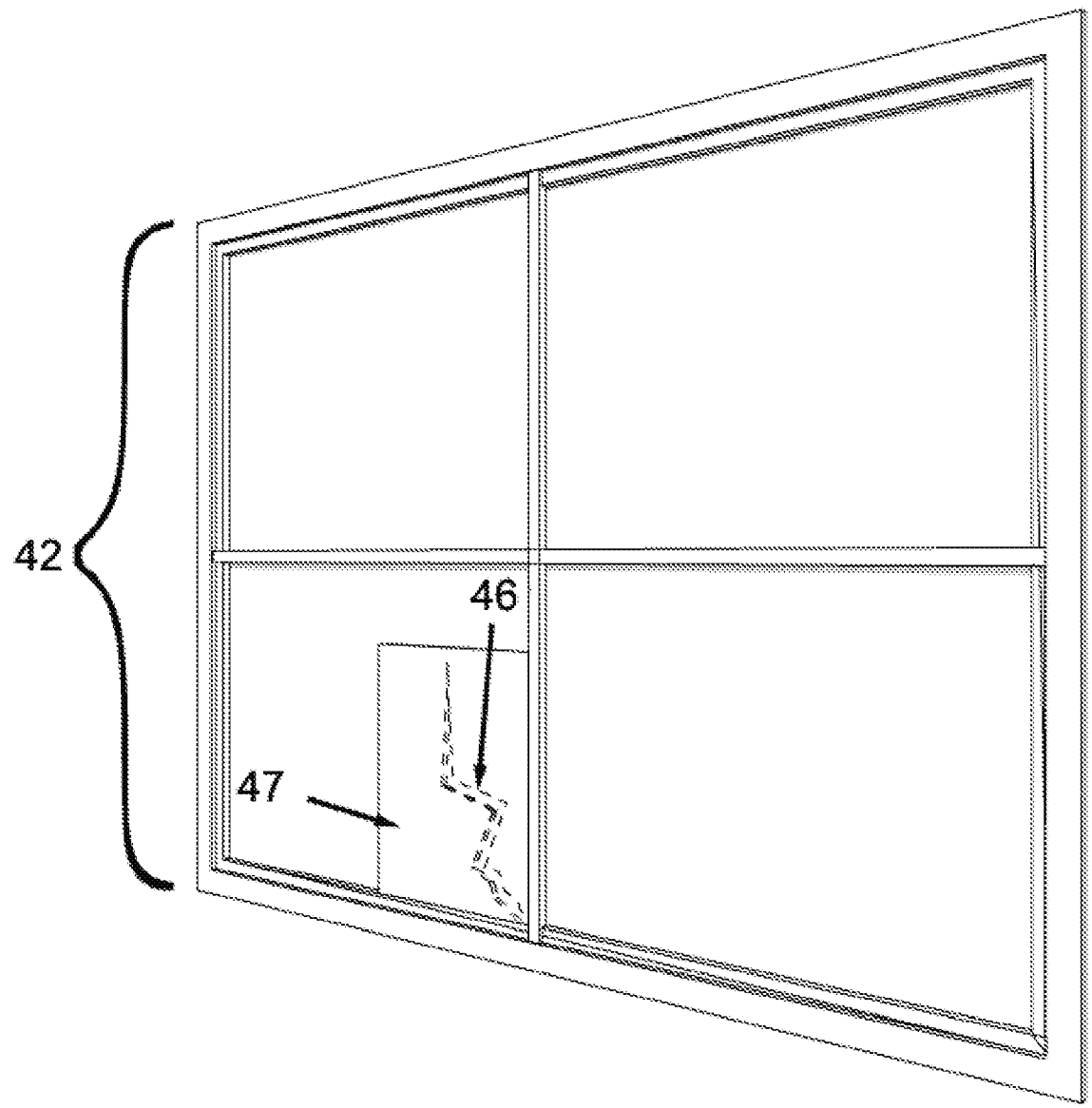
FIG. 9 is shows the repaired window pane and the transparent nature of the repair patch.

In FIG. 7 there is shown a section of a window, 42, with a damaged section, 40. The boat window pane, 41, is made of glass with the window frame being made of wood. FIG. 8 shows a SMP patch, 44, which upon activation, can be used to repair the damaged section, 40. Once the SMP patch has been activated by heat, light or other means the shape memory polymer resin becomes soft and can be easily molded to cover the crack, 40. The homeowner, government personnel, or other repair technician, simply forms the activated SMP patch over the crack, 40, ensuring complete coverage and seals between the glass and the patch. The formed patch, 47, and repaired crack, 46 are shown in FIG. 9. As with the repair to the car windshield, this system ensures a good seal between the patch, 47, and the window, 42, preventing air from flowing into the interior of the building containing the damaged window.

The following contains the generic description of repair materials not discussed specifically above. Once the surface has been prepared for repair using normal methods, the shape memory polymer composite patch is activated by raising its temperature above its $T_g$, by exposure to a specific frequency and intensity of light, or other means of activation. The patch is then initially deformed into a shape that will make it easier to mold into the damaged area and the transition area. While the patch is activated, the patch is formed and molded into the damaged area and surrounded by the transition area so that the entire damaged area and transition area are essentially covered by the patch. The now molded patch has been placed so as to essentially cover the entire damaged area. Additionally, the molded patch, because of its soft and pliable state while activated is able to fill in most gaps and crevices and completely replicate the entire damaged area and machined transition area. As previously noted, this process requires no cure time as the patch is already in an essentially cured state. Once the patch has been molded to the desired area, simply deactivate the patch by allowing the patch to cool below its $T_g$, exposing the patch to a specific frequency and intensity of light, or other means which will return the patch to a hard, rigid state. This process should only take a few minutes.

The composite patch can be bonded to the original part with a variety of systems discussed below. Once cooled and bonded to the original part it is possible that there will be some excess material that will rise above and/or not be flush with the original, undamaged surface. This excess material can be removed through sanding or other machine processes where the final surface of the patch is flush with the original part. Once the patch is flush with the surface of the part the patch may be coated or painted as desired. It is to be appreciated that these repairs can be conducted not only by pure shape memory polymer resins but also by composite parts with a shape memory polymer resin matrix which undergoes the same activation, deformation, and bonding as seen in the above descriptions. It is also to be appreciated that this method of permanent repair can also be used for airplane parts, car parts, and any other manufactured part that can be repaired using a shape memory polymer resins or composite material.

In order to bond the patch to a variety of systems, the adhesive must be chosen very carefully. There are a variety of commercially available adhesive systems for use in bonding shape memory polymer patches to different substrates. The wide range of adhesives will aid in developing different patch systems for different applications. Some adhesives are aerospace compatible, while others can only be used for ground applications or mass produced items. Cryogenic compatible adhesives are also available for use in repairing cryogenic pipes and tanks. These adhesives can be divided into two categories: thermally cured adhesives and pressure-sensitive adhesives. The thermally cured adhesives chosen can be cured at or above the transition temperature of the shape memory polymer as pressure and heat are applied to cure the adhesive, and the patch is soft and easily formed around the area to be patched. The pressure sensitive adhesives are effective for quick repairs in sealing spaces that contain different environments such as the inside of pressure vessels and gas or liquid conduits. These adhesives allow for a quick "bandage-type" approach until a more permanent solution could be achieved. The following adhesives could be used for various applications, but is not intended to limit adhesives within the scope of the present invention to only those listed below:

Thermally Cured Adhesives
    LORD Corporation Products
        310 A/B Epoxy Adhesive
        7542 A/E Urethane Adhesive
    3M Products
        Scotch-Weld AF 563K Film Adhesive
        Scotch-Weld AF 163-2 Film Adhesive
        Scotch-Weld EC 3333 B/A 2-Part Paste Adhesive
        Scotch-Weld EC 3448 Paste Adhesive (1-Part)
    Loctite Products
        Hysol® EA 9309.3 NA Epoxy Paste Adhesive
        Hysol® 615
        Hysol® U-05FL
        Hysol® EA 9361 Epoxy Paste Adhesive
        Hysol® EA 9628 Epoxy Film Adhesive
        Hysol® EA 9695 Epoxy Film Adhesive
        Hysol® EA 9696 Epoxy Film Adhesive
Pressure Sensitive
    3M Products
        9244 Structural Bonding Tape
        468 MPR Structural Bonding Tape
        9485 PC High-Performance Adhesive Transfer Tape
    Budnick Converting, Inc. Products
        P02-Multi-purpose Double-Coated Splicing & Mounting
        1198-UHA Adhesive Transfer
        P50-Multi-purpose Double-Coated Cloth Tape The thermally cured adhesives can be applied by: 1) forming the shape memory polymer patch around the area to be bonded (without adhesive); 2) applying adhesive to the patch; and then 3) bonding the preformed patch to the damaged area through thermal cure. This approach is the easiest and cleanest method for using paste-type adhesives. This method may be enhanced by using vacuum pressure during thermal cure and choosing an adhesive that has a cure temperature above the transition temperature of the shape memory polymer used for the patch. This would allow for a more intimate interface between the patch and the substrate during cure. This helps promote distributed load transfer through the adhesive.

Pressure adhesives are applied to the shape memory polymer patch manually with the backing paper left intact. When repair is desired, 1) the patch/adhesive combination is heated above the transition temperature of the patch, 2) the backing paper is removed and 3) the patch is formed manually or with assistance and adhered simultaneously to the substrate. This method of adhesive application prior to use enables very fast repair scenarios. Additionally for light or electromagnetic radiation activated shape memory polymers, the patch adhesive combination is activated by application of said electromagnetic radiation, the patch is formed manually or with other mechanical assistance to the substrate and deactivated with electromagnetic radiation.

In addition to pressure and thermally cured adhesives the patch may be secured to the damaged area with mechanical means or chemically cured adhesives. The patches may be secured with nuts and bolts, screws, staples, nails, and other similar devices and methods.

The following are examples of the process of bonding shape memory polymers to substrates according to all aspects of the invention:

EXAMPLE 3

In order to bond a shape memory polymer patch to fiberglass, the area around the damaged portion of a part or the area near the portion of the part to be joined to another, the applicable area is scuff sanded and solvent wiped to ensure a clean, smooth bonding surface. Additionally, scuff sand and solvent wipe the side of the patch to be bonded to the substrate. Using 3M's 9485 PC High-Performance Adhesive Transfer Tape, apply the tape to the patch manually leaving the backing on the adhesive. Using the patch from Example 1 heat the patch above its transition temperature in an oven which is at or near 90° C. Remove the patch/adhesive from the oven, peel away the adhesive backing and form patch to fiberglass surface manually or with assistance of a vacuum pad or bagging.

EXAMPLE 4

In order to bond a shape memory polymer composite patch to glass, the area around the damaged portion of a part is lightly sanded to ensure there are no sharp edges and solvent wiped to ensure a clean, smooth bonding surface. Additionally, scuff sand and solvent wipe the side of the patch to be bonded to the substrate to ensure a smooth bonding surface. Apply a thin, even layer of Loctite HYSOL U05-FL paste adhesive to the repair area on the glass. Using the patch from Example 1 heat the patch above its transition temperature. Form the patch to the repair surface manually or with a heating blanket using vacuum pressure. Cure adhesive according to manufacturers recommendations using temperature controller connected to the heating blanket or other method. Remove vacuum blanket after cure.

The bonding of the shape memory polymer patch can be done to various other substrates, metal cans, car fenders, other composite parts, using the method of Example 3 above. The methods described above are useful and one method should be chosen over the other method depending on the application. Thermally cured adhesives should generally be used for higher strength applications where time-to-repair is less critical such as airplane parts, load-bearing structural parts, and other parts with high strength or other mechanical properties as described in Example 4 above. Pressure sensitive adhesives should generally be used for lower strength applications where time-to-repair is more critical or the cost or strength is not as important such as leaking pipes or simple cosmetic repairs. After bonding with the correct adhesive and patch, the repaired part may be used normally. This includes flowing liquids or gasses through pipes at normal operating temperatures and pressures.

Because of the properties inherent in shape memory polymers, components utilizing shape memory polymer as the resin matrix can be temporarily softened, reshaped, and rapidly hardened in real-time to function in a variety of structural configurations. Therefore, it can readily be seen that the present invention provides a quick and easy way to utilize shape memory polymer technology to create a patch that has the flexibility of duct tape with the performance of polymers, plastics, and similar substances.

It is therefore apparent that one exemplary embodiment of the invention provides a method for repairing manufactured parts of the type having a damaged area thereof. A repair material is preformed into a desired shape. The repair material may comprise, for example, a shape memory polymer. The shape memory polymer is activated so that the preformed repair material becomes soft, and it is then deformed into a shape adapted for the repair function. The shape memory polymer is then deactivated while maintaining the polymer in its deformed state. Thereafter, the deformed shape memory polymer is bonded to the damaged area of the manufactured part.

The repair material may comprise a shape memory polymer material formed from at least one type of shape memory polymer. The shape memory polymer may be selected from a host of polymer types including styrene, cyanate esters, maleamide polymers, epoxy polymers, or vinyl ester polymers. In some cases, the shape memory polymer will be a thermoset resin.

The repair material may include a thermal energy generation means embedded therein. Such thermal energy generation means may comprise, for example, thermally conductive fibers or electrical conductors. The inclusion of an embedded thermal energy generation means wilt be especially useful to automotive drivers who will be able to plug the patch into a standard cigarette lighter socket or similar device in their car to activate the shape memory polymer patch.

In another exemplary embodiment of the invention, activation of the shape memory polymer is achieved by heating the polymer above its transition temperature. The heating may, for example, be affected by inductive heating, hot air, or by heat lamps. Additionally, when the repair material comprises a thermal energy generation means embedded therein, it may be activated by applying electrical current to the thermal energy generation means.

In yet another exemplary embodiment of the invention, activation of the shape memory polymer may be achieved by application of electromagnetic radiation such as in the form of visible light or ultraviolet light. Additionally, water and magnetic fields may also be used to activate the shape memory polymer effect.

The deformation step may be achieved via mechanical means such as by pressing in a press mold or by extruding the material through a rolling die mold.

In one exemplary embodiment of the invention, the shape memory polymer is deactivated by reducing the temperature thereof to below its activation temperature. This can be accomplished while the polymer is being press molded so that during the press molding, the polymer is maintained at a temperature below its activation temperature. Further, the deactivation of the shape memory polymer may be achieved by application of electromagnetic radiation such as visible light or ultraviolet light thereto.

The manufactured part may be composed of any material, such as metal, wood, plastic, glass, or in itself may be a composite part or similar material. The bonding step in accordance with the invention may be achieved via a host of conventional means such as via thermally cured adhesives or pressure sensitive adhesives.

In addition to shape memory polymers, other shape memory materials such as shape memory alloys may be mentioned as being effective.

Another aspect of the invention comprises joining a plurality of parts together via use of the shape memory materials. Here, the parts are juxtaposed so that at least one joint or joiner area is formed. A preformed shape memory material such as a shape memory polymer is provided and activated. The shape memory material is then applied to the joint or joiner area and deformed into a desired shape. The shape memory material is deactivated while maintaining it in its deformed shape. The deformed shape is then bonded to the joint area to affect joiner of the parts together.

Although this invention has been described with respect to certain preferred embodiments, it will be appreciated that a wide variety of equivalents may be substituted for those specific elements shown and described herein, all without departing from the spirit and scope of the invention as defined in the appended claims.

What is claimed is:

1. A method for repairing transparent or translucent parts having a damaged area comprising:
   a. preforming a repair material into a desired shape, said repair material comprising a shape memory polymer;
   b. activating said shape memory polymer such that said preformed repair material becomes soft;
   c. deforming said preformed material into a shape adapted for said repairing; wherein said deforming is achieved by mechanical means;
   d. deactivating said shape memory polymer while maintaining said repair material in its deformed state; and
   e. a means for bonding said deformed repair material to said damaged area of said transparent or translucent parts.

2. The method of claim 1 wherein said shape memory polymer is selected from the group consisting of a styrene shape memory polymer, cyanate ester shape memory polymer, maleimide shape memory polymer, epoxy shape memory polymer, acrylate shape memory polymer, polyurethane shape memory polymer, or vinyl ester shape memory polymer.

3. The method of claim 2 wherein said repair material composed of said shape memory polymer is transparent or translucent.

4. The method of claim 1 wherein said shape memory polymer resin is a thermoset resin.

5. The method of claim 1 wherein said repair material comprises an embedded thermal energy generation means.

6. The method of claim 5 wherein said embedded thermal energy generation means comprises thermally conductive fibers.

7. The method of claim 5 wherein said thermal energy generation means comprises an electrical conductor.

8. The method of claim 7 wherein said activation of said shape memory polymer is achieved by applying electrical current to said electrical conductor.

9. The method of claim 1 wherein said activation of said shape memory polymer is by heating said shape memory polymer above its transition temperature.

10. The method of claim 9 wherein said heating is by inductive heating, hot air, or by heat lamps.

11. The method of claim 1 wherein said activation of said shape memory polymer is achieved by application of electromagnetic radiation.

12. The method of claim 11 wherein said electromagnetic radiation is visible light or ultraviolet light.

13. The method of claim 1 wherein said deactivation of said shape memory polymer is achieved by reducing the temperature of said shape memory polymer below its activation temperature.

14. The method of claim 1 wherein said deactivation of said shape memory polymer is achieved by application of electromagnetic radiation.

15. The method of claim 14 wherein said electromagnetic radiation is visible light or ultraviolet light.

16. The method of claim 1 wherein said transparent or translucent part is composed of clear plastic, glass, or other similar transparent or translucent material.

17. The method of claim 1 wherein said means for bonding is by a thermally cured adhesive or a pressure sensitive adhesive.

18. The method of claim 1 wherein said means for bonding is by mechanical means.

19. The method of claim 18 wherein said mechanical means is staples, bolts, screws, nails, and other similar devices.

20. A process for repairing transparent or translucent parts having a damaged area comprising:
   a. preforming a shape memory material into a desired geometric shape;
   b. activating said shape memory material such that said shape memory material becomes soft;
   c. deforming said shape memory material into a shape adapted for said repairing; wherein said deforming is achieved by mechanical means;
   d. deactivating said shape memory material while maintaining it in its deformed state; and
   e. a means for bonding said deformed shape memory material to said damaged area of said transparent or translucent part.

21. The method of claim 20 wherein said shape memory material is a shape memory polymer.

22. The method of claim 21 wherein said shape memory polymer is selected from the group consisting of a styrene shape memory polymer, cyanate ester shape memory polymer, maleimide shape memory polymer, epoxy shape memory polymer, acrylate shape memory polymer, polyurethane shape memory polymer, or vinyl ester shape memory polymer.

23. The method of claim 22 wherein said repair material composed of said shape memory polymer is transparent or translucent.

24. The method of claim 21 wherein said shape memory polymer resin is a thermoset resin.

25. The method of claim 24 wherein said shape memory polymer comprises an embedded thermal energy generation means.

26. The method of claim 25 wherein said embedded thermal energy generation means comprises thermally conductive fibers.

27. The method of claim 25 wherein said thermal energy generation means comprises an electrical conductor.

28. The method of claim 27 wherein said activation of said shape memory polymer is achieved by applying electrical current to said electrical conductor.

29. The method of claim 21 wherein said activation of said shape memory polymer is achieved by heating said shape memory polymer above its transition temperature.

30. The method of claim 29 wherein said heating is by inductive heating hot air, or heat lamps.

31. The method of claim 21 wherein said activation of said shape memory polymer is achieved by application of electromagnetic radiation.

32. The method of claim 31 wherein said electromagnetic radiation is visible light or ultraviolet light.

33. The method of claim 21 wherein said deactivation of said shape memory polymer is achieved by reducing the temperature of said shape memory polymer to below its activation temperature.

34. The method of claim 21 wherein said deactivation of said shape memory polymer is achieved by application of electromagnetic radiation.

35. The method of claim 34 wherein said electromagnetic radiation is visible light or ultraviolet light.

36. The method of claim 20 wherein said transparent or translucent part is composed of plastic, glass, or other similar transparent or translucent material.

37. The method of claim 20 wherein said means for bonding is achieved by a thermally cured adhesive or pressure sensitive adhesive.

38. The method of claim 19 wherein said means for bonding is by mechanical means.

39. The method of claim 38 wherein said mechanical means is staples, bolts, screws, nails, and other similar devices.

* * * * *